United States Patent
Hirata et al.

(10) Patent No.: US 9,233,409 B2
(45) Date of Patent: Jan. 12, 2016

(54) PRESS DIE

(71) Applicant: TOYOTA BOSHOKU KABUSHIKI KAISHA, Aichi-ken (JP)

(72) Inventors: Kazuyuki Hirata, Toyota (JP); Yoshikazu Ichiko, Okazaki (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/284,450

(22) Filed: May 22, 2014

(65) Prior Publication Data

US 2014/0352394 A1    Dec. 4, 2014

(30) Foreign Application Priority Data

May 29, 2013  (JP) ................................ 2013-112832

(51) Int. Cl.
*B21D 5/02* (2006.01)
*B21D 37/02* (2006.01)
*B21D 13/02* (2006.01)
*H01M 8/02* (2006.01)

(52) U.S. Cl.
CPC ............... *B21D 37/02* (2013.01); *B21D 13/02* (2013.01); *H01M 8/0202* (2013.01); *H01M 8/0258* (2013.01); *Y02E 60/50* (2013.01)

(58) Field of Classification Search
CPC .. B21D 13/02; H01M 8/0202; H01M 8/0258; Y02E 60/50
USPC ........................................................ 72/481.1
See application file for complete search history.

(56) References Cited

U.S. PATENT DOCUMENTS

| 3,436,951 | A  | * | 4/1969  | Phillips, Jr. ...................... 72/468 |
| 5,014,540 | A  | * | 5/1991  | Ferrante ........................ 72/482.3 |
| 6,263,721 | B1 | * | 7/2001  | Kawano ........................ 72/481.6 |
| 6,786,828 | B2 | * | 9/2004  | Sørensen ........................ 470/192 |
| 6,826,946 | B2 | * | 12/2004 | Muller et al. .................... 72/446 |
| 6,877,353 | B2 | * | 4/2005  | Rassette et al. ............. 72/482.93 |
| 7,251,973 | B2 | * | 8/2007  | Gharib .............................. 72/61 |
| 2014/0352394 | A1 | * | 12/2014 | Hirata et al. ..................... 72/478 |

FOREIGN PATENT DOCUMENTS

| JP | 11-033988 | 2/1999 |
| RU | 2466814   | 11/2012 |

OTHER PUBLICATIONS

U.S. Appl. No. 14/284,462 to Kazuyuki Hirata, filed May 22, 2014.
U.S. Appl. No. 14/284,482 to Kazuyuki Hirata et al., filed May 22, 2014.
Official Action for DE Pat. App. No. 102014210060.7 having a mailing date of Nov. 11, 2015.

* cited by examiner

*Primary Examiner* — David B Jones
(74) *Attorney, Agent, or Firm* — Greenblum & Bernstein, P.L.C.

(57) ABSTRACT

A press die includes die blocks placed on a base and aligned in a frame. A wedge is located between the frame and one of the die blocks. The wedge produces a wedge effect of bringing the die blocks to an aligned and fixed state. A spacer is located between the base and the wedge to set the extent of the wedge effect to a predetermined level.

5 Claims, 5 Drawing Sheets

PRESS DIE

BACKGROUND OF THE INVENTION

The present invention relates to a press die that is used for forming, for example, a separator for a fuel cell.

Typically, separators used in fuel cells are formed by, as shown in FIG. 6, providing a plate 41 made of a hard material, such as titanium, with contiguous grooves and protrusions 42. The grooves and protrusions 42 define passages thorough which coolant or gas of hydrogen or oxygen flows.

When forming such a separator for a fuel cell, a press die apparatus as shown in FIG. 7 is conventionally used, for example. The press die apparatus includes a lower die 43 and an upper die 44. The lower die 43 has on the upper surface a die surface 431 with grooves and protrusions, and the upper die 44 has on the lower surface a die surface 441 on which grooves and protrusions are formed to correspond to the die surface 431 of the lower die 43. The upper die 44 is arranged above the lower die 43 to be brought toward and away from the lower die 43. With a plate 41, which is a workpiece, placed on the die surface 431 of the lower die 43, the upper die 44 is brought toward the lower die 43 to press the plate 41 between the die surfaces 431, 441 of the dies 43, 44, so that the grooves and protrusions 42 are formed on the plate 41.

When producing the lower die 43 and the upper die 44 of the press die apparatus, the surface of a die material is cut with a cutting tool to form the die surfaces 431, 441 having grooves and protrusions. In a case in which the die material is made of super hard metal, such as high-speed steel, the cutting tool easily becomes dull due to wear. Thus, it is difficult to form the die surfaces 431, 441 by cutting the die material at one stroke in a direction in which the grooves and protrusions extend on the die surfaces 431, 441 without replacing the cutting tool.

To deal with such a problem, a press die apparatus as illustrated in FIG. 8 has conventionally been proposed. The press die apparatus has a lower die 43 formed by die blocks 45, which are separate rectangular columns. The die blocks 45 are placed on a base 46 and fitted in a frame 47 such that the die blocks 45 are aligned. According to this configuration, limited parts of the end faces of the die blocks 45 are cut individually. Thus, the die surface 431 with grooves and protrusions can be easily formed by joining the cut surfaces. Although not illustrated, the upper die of the press die apparatus is configured by assembling die blocks as in the case of the lower die 43.

On the other hand, Japanese Laid-Open Patent Publication No. 11-33988 discloses press die apparatus that punches a workpiece using a punch and a die. The die is a split type and is supported on a die plate to be movable in a horizontal direction. Wedges for adjusting the position of the die in the horizontal direction are arranged on the die plate. The wedges are allowed to move in the vertical direction by adjuster screws. When the wedges are moved vertically by the adjuster screws, the die is moved horizontally by the wedge effect of the wedges so that the clearance between the punch and the die is adjusted. The die is then fixed to the adjusted position.

SUMMARY OF THE INVENTION

However, the above mentioned conventional arts have the following shortcomings.

In the press die apparatus shown in FIG. 8, since the lower die 43 is formed by the split die blocks 45, the die blocks 45 need to be brought to a properly aligned and fixed state in the frame 47. If the die blocks 45 are not in a properly aligned state, the die surface 431 will not have desired contiguous grooves and protrusions, which will significantly degrades the accuracy of the pressing of workpiece.

The press die apparatus disclosed in Japanese Laid-Open Patent Publication No. 11-33988 has a structure for moving the die to adjust its position by the wedge effect of the wedges so that a predetermined clearance is formed between the punch and the die and fixing the die at the adjusted position. However, no structure is suggested that always positions the die at a predetermined adjusted position. Thus, when the die is disassembled and then reassembled, it is difficult to restore the state of the die before the disassembly to form the same clearance between the punch and the die as that before the disassembly. Thus, even if the configuration disclosed in Japanese Laid-Open Patent Publication No. 11-33988 is applied to the press die apparatus shown in FIG. 8, so that the die blocks 45 can be brought to an aligned state by the wedge effect of the wedges, it would be difficult, when the die blocks 45 are replaced, to restore the aligned state with the replacing die blocks 45.

Accordingly, it is an objective of the present invention to provide a press die that is capable of easily bringing die blocks to an aligned state in a frame and is also capable, when the die blocks are replaced, of easily restoring the aligned state with the replacing die blocks.

To achieve the foregoing objective and in accordance with one aspect of the present invention, a press die is provided that includes a base, die blocks placed on the base, a frame surrounding the die blocks, a wedge, and a spacer. The wedge is located between the frame and one of the die blocks, and produces a wedge effect of bringing the die blocks to an aligned and fixed state. The spacer is located between the base and the wedge to set the extent of the wedge effect to a predetermined level.

Other aspects and advantages of the invention will become apparent from the following description, taken in conjunction with the accompanying drawings, illustrating by way of example the principles of the invention.

DETAILED DESCRIPTION OF THE PREFERRED EMBODIMENTS

A press die apparatus having a press die according to one embodiment of the present invention will now be described with reference to FIGS. 1 to 5.

Figure 1:
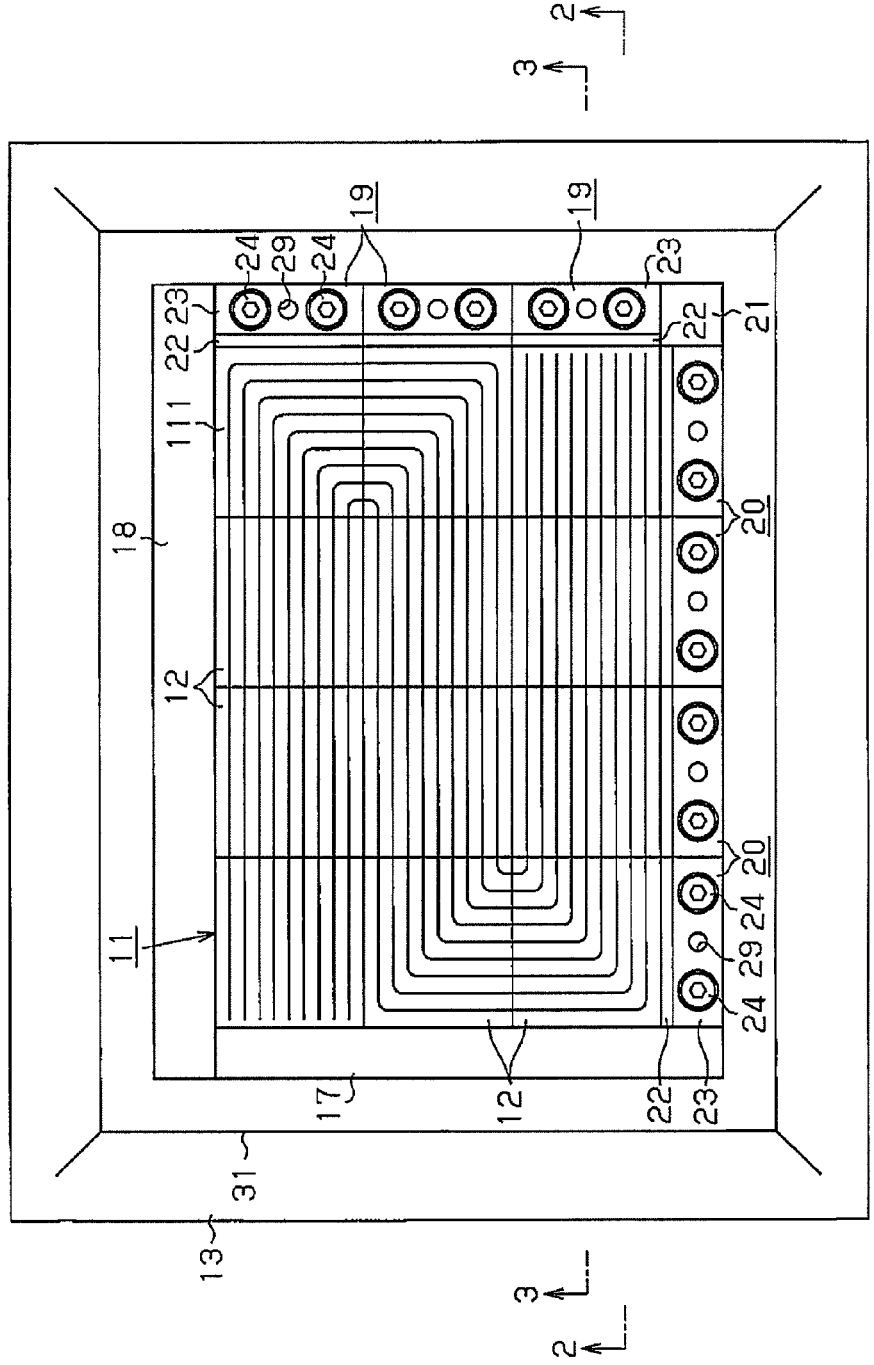
FIG. 1 is a plan view illustrating a press die according to one embodiment of the present invention.
Figure 2:
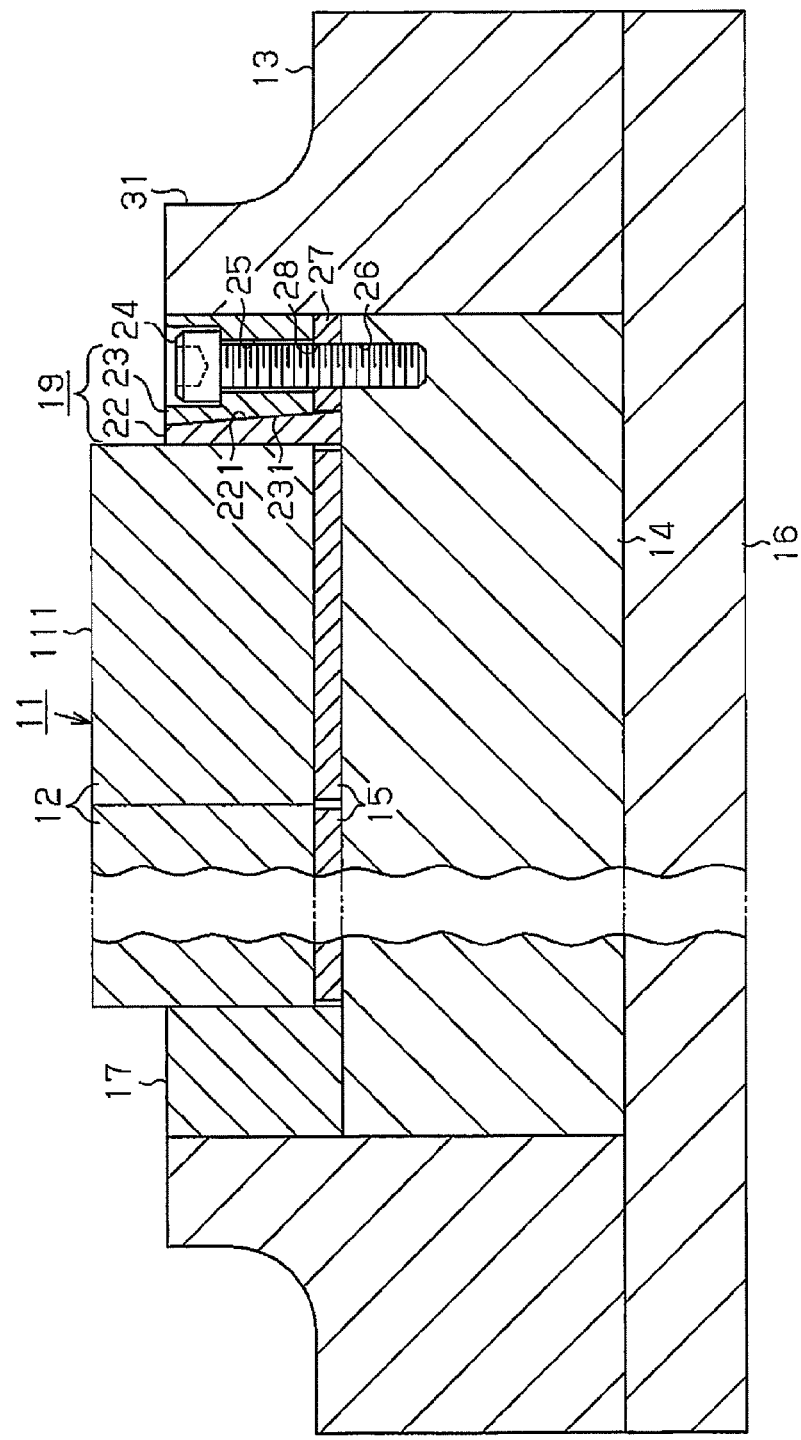
FIG. 2 is a partial cross-sectional view taken along line 2-2 of FIG. 1.

As shown in FIGS. 1 and 2, the press die apparatus of the present embodiment includes a lower die 11, which is a press die and has on the upper surface a die surface 111 with grooves and protrusions. Although not illustrated, an upper die, which can be brought toward and away from the lower die 11, is arranged above the lower die 11. The upper die has on the lower surface a die surface, which has grooves and protrusions corresponding to the shape of the die surface 111 of the lower die 11. With a workpiece placed on the lower die 11, the upper die is brought toward the lower die 11 to press the workpiece between the die surfaces of the dies to have a predetermined shape with grooves and protrusions.

As illustrated in FIGS. 1 and 2, the lower die 11 is formed by die blocks 12, which are separate rectangular columns. The die blocks 12 are arranged in a frame 13, which has an oblong rectangular shape as viewed from above to surround the die blocks 12, and placed on a base 14 with shims 15 arranged in between. The frame 13 and the base 14 are fixed to a support plate 16. The die blocks 12 have the same size and are aligned lengthwise and widthwise in the frame 13.

As shown in FIGS. 1 and 2, a block-shaped space member 17 is located between the inner surface of the frame 13 that is located at one end in the longitudinal direction of the frame 13 and the die blocks 12 adjacent thereto. Also, a block-shaped space member 18 is located between the inner surface of the frame 13 that is located at one end in the transverse direction of the frame 13 and the die blocks 12 adjacent thereto. A wedge 19 is located between the inner surface of the frame 13 that is located at the other end in the longitudinal direction of the frame 13 and each of the die blocks 12 adjacent thereto. Also, a wedge 20 is located between the inner surface of the frame 13 that is located at the other end in the transverse direction of the frame 13 and each of the die blocks 12 adjacent thereto. The wedges 19 and wedges 20 press the die blocks 12, which are aligned lengthwise and widthwise, toward the space member 17 and space member 18, respectively, so that the blocks 12 are fixed in the aligned state. A space member 21 that is formed as a small piece is located in a corner of the frame 13 between the wedge 19 and wedge 20 that are adjacent to each other.

The configuration of the wedges 19, 20 will now be described. Since the wedges 19 have the same structures as those of the wedges 20, only the wedges 19 will be described, and the description of the wedges 20 will be omitted.

As shown in FIGS. 1 and 2, each wedge 19 includes a first wedge member 22, which is located adjacent to the corresponding die block 12 and is located on the base 14, and a second wedge member 23, which is located between the first wedge member 22 and the frame 13. The facing side surfaces of the wedge members 22, 23 are formed as inclined surfaces 221, 231 contacting each other. The inclined surfaces 221, 231 gradually approach the frame 13 from the upper end to the lower end of the wedge 19. The second wedge member 23 has a pair of insertion holes 25 for allowing screws 24 pass through the upper and lower surface of the second wedge member 23. The base 14 has screw holes 26, with which the screws 24 are threaded, at positions corresponding to the insertion holes 25.

The screws 24 are threaded and fastened to the screw holes 26 via the insertion holes 25 from above the second wedge member 23, so that the second wedge member 23 is moved toward the base 14. Accordingly, the wedge effect due to interaction between the inclined surfaces 221, 231 of the wedge members 22, 23 presses the first wedge member 22 against the die block 12. This presses the die blocks 12 in the corresponding longitudinal row toward the space member 17, so that there is no clearance between the die blocks 12.

As shown in FIG. 2, a flat plate-like spacer 27 is located between each second wedge member 23 and the base 14.

The spacer 27 has two insertion holes 28 for allowing the screws 24 to pass through. The spacer 27 limits the amount of movement of the second wedge member 23 toward the base 14 during fastening with the screws 24. That is, the thickness of each spacer 27 sets to a predetermined level the extent of the wedge effect produced by the wedge members 22, 23 of the corresponding wedge 19, or in other words, the force by which the die blocks 12 in the corresponding longitudinal row are pressed toward the space member 17.

Figure 3:
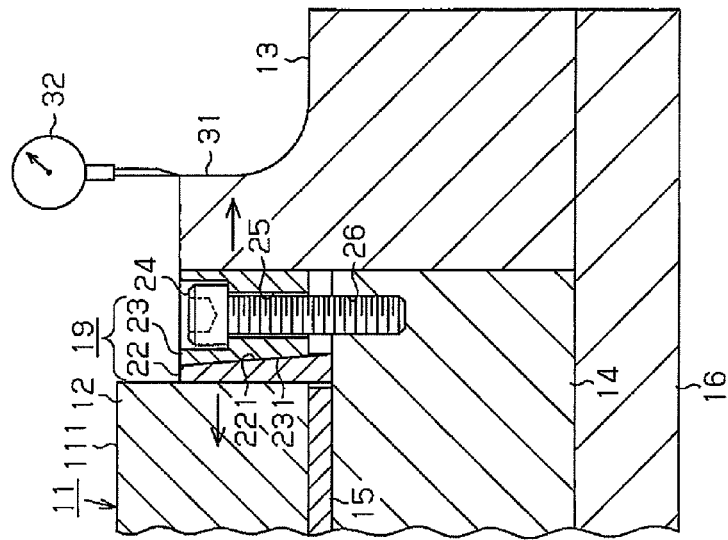
FIG. 3 is a partial cross-sectional view taken along line 3-3 of FIG. 1.

As shown in FIGS. 1 and 3, each second wedge member 23 has a through hole 29 at the center. The through hole 29 extends between the upper and lower surfaces of the second wedge member 23. The lower surface of the second wedge member 23 faces the base 14, and the upper surface of the second wedge member 23 faces in the direction opposite to the base 14. The through hole 29 is used to measure the height position of the second wedge member 23. That is, when each second wedge member 23 is moved toward the base 14 by fastening the screws 24 without placing the spacer 27 between the base 14 and the second wedge member 23, as a result of which the die blocks 12 are brought to an aligned state, the height position of the second wedge member 23 is measured by using the through hole 29.

Figure 5:
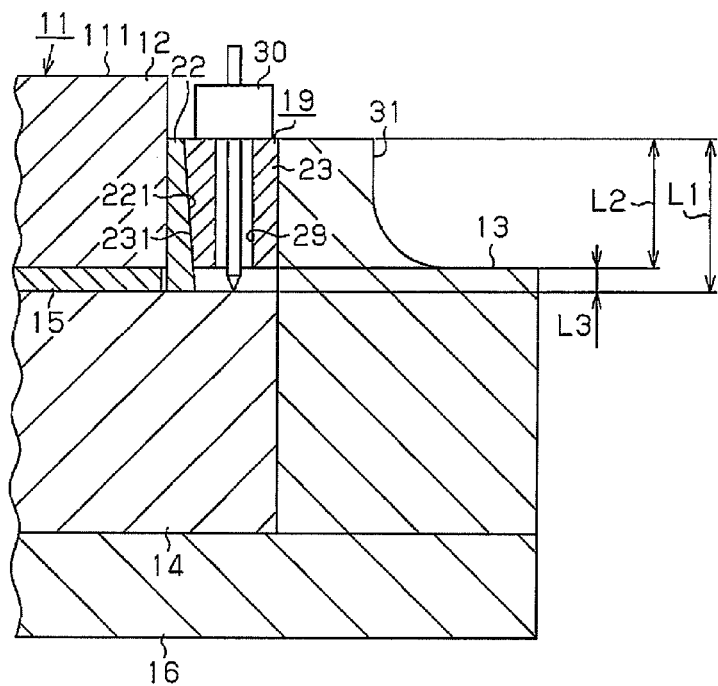
FIG. 5 is an explanatory partial cross-sectional view of the die block fixing method subsequent to FIG. 4.
Figure 6:
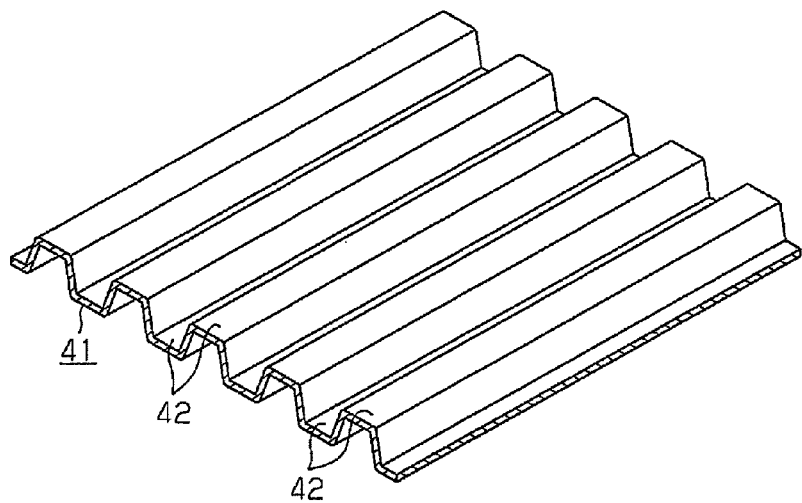
FIG. 6 is a perspective view illustrating a part of a typical separator for a fuel cell.
Figure 7:
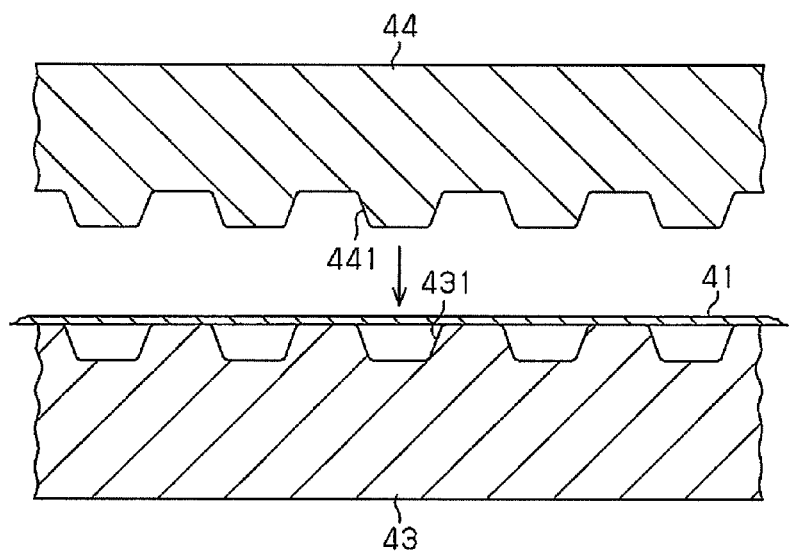
FIG. 7 is a cross-sectional view illustrating a conventional press die apparatus for forming the fuel cell separator of FIG. 6.
Figure 8:
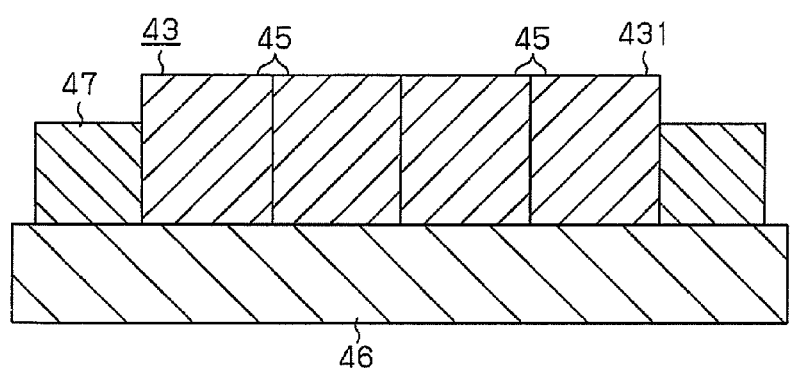
FIG. 8 is a cross-sectional view illustrating a lower die of another conventional press die apparatus.

Specifically, referring to FIG. 5, with the die blocks 12 arranged in an aligned state, a gauge 30 is passed through the through hole 29 to measure the height position of the second wedge member 23, or the distance L1 from the upper surface of the second wedge member 23 to the upper surface of the base 14. Then, the thickness L2 of the second wedge member 23 is subtracted from the measured distance L1 to obtain the gap size L3 between the lower surface of the second wedge member 23 and the upper surface of the base 14. Thereafter, the spacer 27 is ground to have the same thickness as the gap size L3 and is placed between the second wedge member 23 and the base 14.

Figure 4:
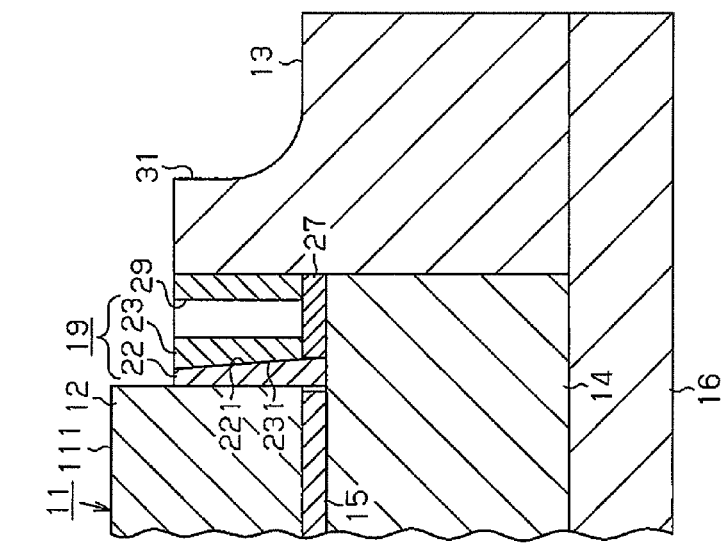
FIG. 4 is an explanatory partial cross-sectional view of a method for fixing die blocks of the press die in an aligned state.

As shown in FIGS. 1 and 2, a measurement surface 31 is formed on the periphery of the upper portion of the frame 13. The measurement surface 31 is used to measure deformation of the frame 13 caused by the wedge effect of the wedge members 22, 23. As shown in FIG. 4, the position of the measurement surface 31 is measured with a position alignment gauge 32 when each second wedge member 23 is moved toward the base 14 to bring the die blocks 12 to an aligned state by fastening the screws 24 without placing the spacer 27 between the base 14 and the second wedge member 23. Accordingly, it is possible to determine whether the die blocks 12 are arranged in a predetermined aligned state based on the amount of deformation of the frame 13 caused by the wedge effect of the wedge members 22, 23.

Although not illustrated, the upper die of the press die apparatus is formed by die blocks, which are separate rectangular columns aligned in a frame and placed on a base, as in the case of the lower die 11. A wedge is located between the frame of the upper die and each of the die blocks adjacent to the frame to bring the die blocks of the upper die to an aligned and fixed state by the wedge effect of the wedges. Also, a spacer is provided between the base and each wedge of the upper die to set the extent of the wedge effect of the wedge to a predetermined level.

Operation of the press die apparatus will now be described.

To bring the die blocks 12, which form the lower die 11, to an aligned state in the frame 13, each second wedge member 23 is moved toward the base 14 by fastening the screws 24 without placing the spacer 27 between the base 14 and the second wedge member 23 as shown in FIG. 4. Accordingly, the wedge effect due to interaction between the inclined surfaces 221, 231 of the wedge members 22, 23 presses and moves the die blocks 12 in the corresponding longitudinal row toward the space member 17, so that the die blocks 12 are arranged in an aligned state. At this time, the frame 13 is pushed outward and deformed by the wedge effect of the wedge members 22, 23. The amount of deformation of the frame 13 is measured at the measurement surface 31 of the frame 13 with the position alignment gauge 32. When the measured deformation amount has reached a predetermined value, it is assumed that the die blocks 12 have been brought to a predetermined aligned state.

Subsequently, in the predetermined aligned state of the die blocks 12, the gauge 30 is passed through the through hole 29 of each second wedge member 23 to measure the distance L1 from the upper surface of the second wedge member 23 to the upper surface of the base 14 as shown in FIG. 5. Then, the thickness L2 of the second wedge member 23 is subtracted from the measured distance L1 to obtain the gap size L3 between the lower surface of the second wedge member 23 and the upper surface of the base 14. Thereafter, the spacer 27 is ground to have the same thickness as the gap size L3 and is placed between the second wedge member 23 and the base 14.

By providing the spacer 27 between each second wedge member 23 and the base 14 in this manner, when the die blocks 12 are replaced, the aligned state can be easily restored with the replacing die blocks 12. That is, at the time of moving each second wedge member 23 toward the base 14 by fastening the screws 24 to bring the replacing die blocks 12 to an aligned state, the lower surface of the second wedge member 23 contacts the spacer 27 as shown in FIG. 2 when the extent of the wedge effect of the wedge members 22, 23 reaches the predetermined level. Accordingly, movement of the second wedge member 23 toward the base 14 is restricted, and the die blocks 12 after the replacement are arranged in the same aligned state as that before the replacement.

The present embodiment therefore has the following advantages.

(1) The press die of the present embodiment includes die blocks 12, which are located on the base 14 and arranged in an aligned and fixed state in the frame 13. A wedge 19 is located between the frame 13 and each of the die blocks 12 adjacent to the frame 13. The wedge effect of the wedges 19 brings the die blocks 12 to the aligned and fixed state. A spacer 27 is provided between the base 14 and each wedge 19 to set the extent of the wedge effect to a predetermined level.

Accordingly, the die blocks 12 are easily brought to the aligned and fixed state in the frame 13 by the wedge effect produced by adjusting the wedges 19. Further, since the amount of movement of each wedge 19 is limited by the spacer 27 provided between the base 14 and the wedge 19, the extent of the wedge effect of the wedge 19 is set to the predetermined level. Therefore, when the die blocks 12 are replaced, the aligned state of the die blocks 12 before the replacement can be easily restored with the replacing die blocks 12.

(2) By fastening a screw 24 to one of the screw holes 26 on the base 14, the corresponding wedge 19 is adjusted to increase the wedge effect produced by the wedge 19. Therefore, the die blocks 12 are easily brought to the aligned and fixed state through adjustment of the wedges 19 by fastening the screws 24.

(3) Each wedge 19 has a through hole 29, which extends between the upper and lower surfaces of the wedge 19. The lower surface of the wedge 19 faces the base 14, and the upper surface of the wedge 19 faces in the direction opposite to the base 14. The through hole 29 allows the position of the wedge 19 to be measured when the wedge 19 is adjusted to bring the die blocks 12 to an aligned state by fastening the screws 24 without providing the spacer 27 between the base 14 and the wedge 19. Based on the measured position of the wedge 19, the thickness of the spacer 27 to be placed between the base 14 and the wedge 19 can be determined.

(4) Each wedge 19 is formed by a first wedge member 22 and a second wedge member 23, which have the contactable inclined surfaces 221, 231, respectively. The second wedge member 23 of each wedge 19 has insertion holes 25, through which the screws 24 are passed, and the through hole 29. Each spacer 27 is provided between the corresponding second wedge member 23 and the base 14. This structure produces wedge effect through interaction between the inclined surfaces 221, 231 of the wedge members 22, 23, without providing inclined surfaces on the side surfaces of the die blocks 12.

(5) The frame 13 has a measurement surface 31 for measuring deformation of the frame 13 caused by the wedge effect of the wedges 19. Therefore, in a state in which the spacer 27 is not provided between the base 14 and each wedge 19, it can be confirmed whether the die blocks 12 are arranged in a predetermined aligned state based on the amount of deformation of the frame 13 measured at the measurement surface 31 when adjusting the wedges 19 to bring the die blocks 12 to the aligned state by fastening the screws 24.

The present embodiment may be modified as follows.

Confirmation of whether the die blocks 12 are arranged in a predetermined aligned state may be made visually or by image processing instead of based on the amount of deformation of the frame 13 measured by the position alignment gauge 32.

The spacers 27 may be each formed by laminating two or more spacer pieces.

The structure of the wedges 19, 20 may be changed as necessary. For example, each of the wedges 19, 20 may have only one insertion hole 25, and each second wedge member 23 may be fixed by a single screw 24.

What is claimed is:

1. A press die comprising:
 a base;
 a plurality of die blocks placed on the base;
 a frame surrounding the die blocks;
 a wedge located between the frame and one of the die blocks and configured to align the die blocks in a fixed state; and
 a spacer located between the base and the wedge to control the extent of the alignment of the die blocks in the fixed state at a predetermined level.

2. The press die according to claim 1, further comprising a screw, wherein
 the base has a screw hole, into which the screw is threaded, and
 when the screw is fastened, the wedge further aligns the die blocks in the fixed state.

3. The press die according to claim 1, wherein the wedge has a surface facing the base and a surface facing in a direction opposite to the base, and the wedge has a through hole extending between the two surfaces.

4. The press die according to claim 3, wherein
 the wedge includes first and second wedge members each having an inclined surface, the inclined surfaces contacting with each other,
 the through hole is provided in the second wedge member,
 the second wedge member has an insertion hole, through which a screw is passed, and the spacer is located between the base and the second wedge member.

5. The press die according to claim 1, wherein the frame has a measurement surface for measuring deformation of the frame caused by the wedge.

\* \* \* \* \*